(12) United States Patent
Puetter

(10) Patent No.: US 8,396,313 B2
(45) Date of Patent: Mar. 12, 2013

(54) IMAGE COMPRESSION AND DECOMPRESSION USING THE PIXON METHOD

(75) Inventor: Richard Puetter, San Diego, CA (US)

(73) Assignee: Pixon Imaging, Inc., San Diego, CA (US)

( * ) Notice: Subject to any disclaimer, the term of this patent is extended or adjusted under 35 U.S.C. 154(b) by 812 days.

(21) Appl. No.: 12/596,975

(22) PCT Filed: Apr. 17, 2008

(86) PCT No.: PCT/US2008/060692
§ 371 (c)(1),
(2), (4) Date: Oct. 21, 2009

(87) PCT Pub. No.: WO2008/134256
PCT Pub. Date: Nov. 6, 2008

(65) Prior Publication Data
US 2010/0119166 A1    May 13, 2010

Related U.S. Application Data

(60) Provisional application No. 60/914,030, filed on Apr. 25, 2007.

(51) Int. Cl.
*G06K 9/46* (2006.01)
*G06K 9/36* (2006.01)
(52) U.S. Cl. .................. 382/249; 382/232; 382/233
(58) Field of Classification Search .................. None
See application file for complete search history.

(56) References Cited

U.S. PATENT DOCUMENTS

| | | | |
|---|---|---|---|
| 4,667,304 A | 5/1987 | Hier et al. | |
| 4,720,745 A | 1/1988 | DeForest et al. | |
| 4,908,876 A | 3/1990 | DeForest et al. | |
| 5,170,193 A | 12/1992 | McMillan et al. | |
| 5,440,647 A | 8/1995 | Floyd, Jr. et al. | |
| 5,467,404 A | 11/1995 | Vuylsteke et al. | |
| 5,500,685 A | 3/1996 | Kokaram | |
| 5,802,218 A | 9/1998 | Brailean | |

(Continued)

FOREIGN PATENT DOCUMENTS

| WO | WO2005048192 A1 | 5/2005 |
|---|---|---|
| WO | WO2006117781 A2 | 11/2006 |

OTHER PUBLICATIONS

International Search Report and Written Opinion from PCT/US2008/060692 issued Sep. 9, 2008.

*Primary Examiner* — Chan S Park
*Assistant Examiner* — Ha Le
(74) *Attorney, Agent, or Firm* — Eleanor M. Musick; Procopio, Cory, Hargreaves & Savitch LLP

(57) ABSTRACT

A method is provided for decompressing an image originally compressed using a known compression technique. An original compressed image file is defined by a plurality of locations that correspond to image data. A set of smooth test images is created by iteratively applying a plurality of different size PIXON® kernels to each location of a starting image beginning with a smallest size kernel. Each smooth test image is compressed using the known compression technique, then compared against the original compressed image at each location of the image to determine a goodness-of-fit of the compressed smooth test image to each location of the original compressed image file. For each location, the smooth test image that has the largest size kernel that passes a pre-determined goodness-of-fit criterion is selected for a given location of the decompressed image. A compression method utilizes the PIXON® method for optimization of knot points within an image. The optimized knot points are used to interpolate image intensity between the knot points.

12 Claims, 11 Drawing Sheets

U.S. PATENT DOCUMENTS

| | | |
|---|---|---|
| 5,912,993 A | 6/1999 | Puetter et al. |
| 5,946,038 A | 8/1999 | Kalker |
| 6,002,794 A * | 12/1999 | Bonneau et al. ............ 382/166 |
| 6,166,384 A | 12/2000 | Dentinger et al. |
| 6,188,804 B1 | 2/2001 | Weldy et al. |
| 6,353,688 B1 | 3/2002 | Puetter et al. |
| 6,490,374 B2 | 12/2002 | Puetter et al. |
| 6,882,997 B1 | 4/2005 | Zhang et al. |
| 6,895,125 B2 | 5/2005 | Puetter et al. |
| 6,993,204 B1 | 1/2006 | Yahil et al. |
| 7,328,182 B1 | 2/2008 | Yahil et al. |
| 2003/0174900 A1 | 9/2003 | Puetter et al. |

* cited by examiner

FIG. 11a
FIG. 11b
FIG. 11c
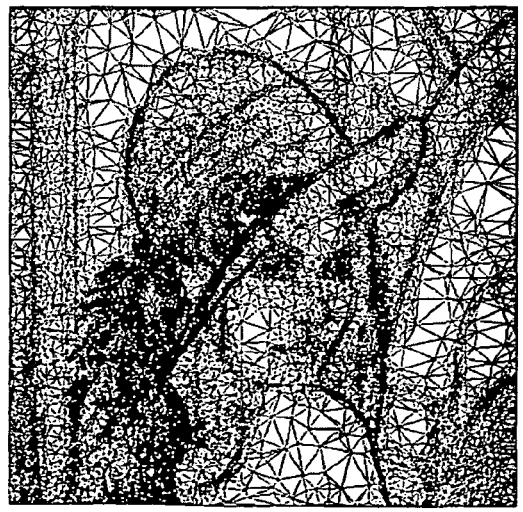

US 8,396,313 B2

IMAGE COMPRESSION AND DECOMPRESSION USING THE PIXON METHOD

RELATED APPLICATIONS

This application claims the priority of U.S. Provisional Application No. 60/914,030, filed Apr. 25, 2007, which is incorporated herein by reference in its entirety.

BACKGROUND OF THE INVENTION

In many military, communication and security applications, it is desirable to compress image data to reduce the bandwidth requirements of wireless and networked-based systems over which the image data is transmitted. By reducing the amount of data associated with these images, the amount of storage space required can also be minimized, allowing long image sequences to be stored on a single disk.

The most widely used image-compression methods are JPEG, MJPEG, MPEG, and H.264, which are block-based techniques. These methods operate by transforming the original image using a discrete cosine transform (DCT), then quantizing the transform coefficients. The DCT separates the image into parts (or spectral sub-bands) of differing importance with respect to the image's visual quality, transforming the image from the spatial domain to the frequency domain. To decompress these images, most commercially-available hardware and software implementations use the inverse DCT. To achieve large amounts of compression, block transform coding is generally lossy, meaning that image information is permanently discarded during compression so that the original image cannot be perfectly reconstructed from the compressed version. In the process of compression and decompression, the 8×8 matrices of sub-image blocks associated with the transform often produce image block artifacts, where the outlines of the encoding blocks are superimposed on the image as distinct transitions from one block to another. When the amount of compression is low, the loss of information is slight and unobjectionable. However, at higher compression levels, the information loss becomes increasingly apparent and is associated with the occurrence of visible artifacts relating to the block nature of the encoding and to the quantization of DCT coefficients. JPEG attempts to exploit certain features of human vision, which perceives less detail in color than in brightness, and so encodes chrominance in larger blocks than those used for luminance. This technique leads to additional artifacts at high compression. Because each sub-block (and each macroblock) is processed independently, a critical portion of the image data that connects neighboring blocks is often lost and superfluous edges and discontinuities appear at the block boundaries.

In addition to block artifacts, since the transform data is quantized, information is lost such that the content of the block cannot be reproduced accurately. These "mosquito artifacts", or "ringing", appear as an aura or halo around objects.

A number of adaptive filtering methods have been developed for reduction of block artifacts and ringing. A few examples of such methods are provided in U.S. Pat. No. 6,636,645 of Yu; U.S. Pat. No. 7,076,113 of Le Dinh, and U.S. Pat. No. 7,136,536 of Andersson. While these filtering methods have been successful in reducing the artifacts, in some cases, additional features (artifacts) can be added, or data is lost.

The PIXON® method, disclosed in U.S. Pat. No. 5,912,993, and U.S. Pat. No. 6,895,125, incorporated herein by reference, was originally developed for image reconstruction.

In such applications the PIXON® method provides superior performance relative to competing methods, providing enhanced spatial resolution and reduced artifacts in the reconstructed image. These benefits can be traced to the PIXON® method's minimum complexity model for the reconstructed image.

The PIXON® image reconstruction scheme built its minimum complexity model by expressing the reconstructed image as a convolution of a pseudo-image with PIXON® kernels that had spatially variable size and shape. The meaning of "minimum complexity" is context dependent. When one is trying to build a minimum complexity hypothesis (model) to answer certain questions with regard to the data (the context), the minimum complexity hypothesis (model) is that which is least informative about the answers to those questions. In the case of images, since the questions of interest are typically: (a) what are the shapes of objects; (b) where are the objects located, and (c) what is the flux density of emission, etc. The minimum complexity model (least informative hypothesis) is the smoothest image consistent with the data. This smoothest image provides the least amount of information on the shapes of objects, their exact location, and the flux density is as spread out as possible. Hence, one can guarantee that with regard to these questions, the data will not be over interpreted. Such a model also automatically eliminates reconstruction artifacts and increases sensitivity and resolution since the artifact level is maximally reduced.

In the PIXON® method, the pseudo-image and PIXON® kernels are allowed to vary on a pixel-by-pixel basis. While this reduces the information content of the reconstructed image dramatically by causing adjacent pixels to be strongly correlated (they were no longer independent numbers), the method goes in the opposite direction of image compression since, for each image, one must specify not only the pseudo-image at each pixel, but the choice of a multitude of PIXON® kernels. In other words, writing down the image directly is much terser than describing the method by which this image was obtained. Therefore, this choice of language for describing the image is not useful for simplifying the image description relative to writing down the image itself.

Nonetheless, given its superior performance for image reconstruction, it would be desirable to adapt the PIXON® method for use in image compression and decompression. The present invention is directed to such a method.

SUMMARY OF THE INVENTION

The minimum complexity image model of the PIXON® method is applied to image compression and decompression operations. In the field of data compression, one normally distinguishes between strong but lossy versus moderate and non-lossy compression. The PIXON® method may be used to decompress images that were compressed with industry-standard compression methods, e.g. JPEG, MJPEG (Motion JPEG used in the motion picture industry), MPEG, and H.264 (both used for videos). The PIXON® method may also be extended to nearly all modern image compression approaches.

In a first aspect of the invention, a decompression method for an input image file that has been compressed using an industry-standard compression method involves iteratively comparing the compressed image file to each of a plurality compressed smooth test image files, and selecting the smooth test image that meets a predetermined goodness-of-fit criterion for each location within the image. The smooth test images are generated by applying each of a plurality of PIXON® kernels to the original decompressed image file.

Each smooth test image file is then recompressed using the same industry-standard compression method and compared segment-by-segment to the original compressed image. For a given location within the image, the smoothest smooth test image that, when compressed, falls within a specified tolerance of a goodness-of-fit criterion of the original compressed image file is identified as the desired decompressed image corresponding to that location in the image. For each location, the largest kernel capable of meeting the specified tolerance is selected to avoid information loss from over-smoothing. The resulting decompressed image is assembled location by location using the corresponding pixels from the selected smooth test image. The decompressed image is then downloaded to a display or storage device.

In another aspect of the invention, a method is provided for decompressing an image originally compressed using a known compression technique, including the steps of inputting an original compressed image file having a plurality of locations corresponding to image data into a processor having a memory and software stored therein for executing a PIXON® method; generating a plurality of smooth test images within a solution space by iteratively applying a plurality of different size PIXON® kernels to each location of a starting image beginning with a smallest size kernel of the plurality; compressing each smooth test image using the known compression technique and determining a goodness-of-fit of the compressed smooth test image to each location of the original compressed image file; for each location, selecting the smooth test image having the largest size kernel that passes a pre-determined goodness-of-fit criterion; and outputting the selected smooth test image as an optimized decompressed image for display on a display device.

In still another aspect of the invention, a method for decompressing an image using a PIXON® method includes inputting an original compressed image file having a plurality of locations corresponding to image data, where the image file was originally compressed using an industry-standard compression method into a processor having a memory and software stored therein for decompressing an image and executing the PIXON® method; decompressing the original compressed image using a corresponding industry-standard decompression method to produce an original compressed image data file; smoothing the original decompressed image using the smallest kernel selected from a plurality of different kernels to produce a first candidate image; compressing the first candidate image using the industry-standard compression method; comparing the first compressed candidate image to the original compressed image file to determine a goodness-of-fit within a predetermined tolerance at each of the plurality of locations within the original compressed image file; accepting the first candidate image at each location at which the goodness-of-fit is within the predetermined tolerance and leaving the original decompressed image at all other locations; repeating the steps of smoothing and comparing for each remaining kernel of the plurality of different kernels to produce a plurality of different candidate images, wherein, following, each iteration, the corresponding candidate image is accepted at each location at which the goodness-of-fit is within the predetermined tolerance and all other locations are left with the previous candidate image, and wherein the resulting decompressing image remains after the final iteration; storing the resulting decompressed image in the memory; and outputting the resulting decompressed image to display device such a computer monitor, graphic display or printer.

In the preceding embodiment, a solution space comprises the candidate images that can be obtained by smoothing the original industry-standard decompressed image. In an alternative embodiment, a larger solution space is created using a general PIXON® image model consisting of a pseudo-image smoothed by a collection of PIXON® kernels. The PIXON® map, consisting of a collection of the PIXON® kernels to be used at each pixel of the image, is generated by finding the combination of broadest PIXON® kernels at each pixel within the image along with the pseudo-image which minimizes the GOF. Alternatively, the pseudo-image can be optimized by minimizing the goodness-of-fit using a conjugate gradient method while holding the PIXON® kernels fixed, followed by maximizing the width of the PIXON® kernels with the pseudo-image being fixed. This two step procedure is iterated until convergence of the pseudo-image and PIXON® map has been achieved. Other multi-dimensional optimization methods, such as a simplex algorithm, are known in the art and may be used.

One benefit of this iterative procedure relative to smoothing the industry-standard decompressed image is that smoothing process cannot introduce image content that is not contained in the compression data; it only takes away structure. Because the addition of image information is required in order to produce the simplest model consistent with the data, simultaneous optimization of a pseudo-image and the PIXON® map according to the iterative embodiment, can introduce spatial structure that had been lost in the compression step.

In another embodiment a method of building an information-based coordinate system to optimally compress/decompress images using the PIXON® method includes inputting an image file that includes image data into a processor and associated memory that stores software for executing a PIXON® method, where the image file includes a plurality of locations corresponding to the image data. The method may also include executing a first algorithm that utilizes the information density within the data images identified by the PIXON® method to calculate one or more image data points to generate an image map that represents a model of the received image data. A second algorithm may be executed to optimize the one or more image data points, including the positions and intensities of the image data points to reduce the number of image data points. The reduced number of image data points can then be re-optimized and a goodness of fit is determined between the locations corresponding to the image data received and the one or more image data points to ensure that the GOF is within a predetermined tolerance at each location in the image data. The one or more image data points may be accepted as the candidates for image compression at the locations that are within the predetermined tolerance, with corresponding portions of the received image data being used elsewhere. In one embodiment, the one or more image data points include knot points. The method may also include encoding the one or more image data points including the image data point position and value to be used for compression of the image data. The first algorithm may include an image interpolation algorithm and the second algorithm may include a simplex (or other) minimization algorithm. In some embodiments, a model of the received image data is constructed through linear interpolation of image intensity between the knot points.

BRIEF DESCRIPTION OF THE DRAWINGS

The aspects, advantages and details of the present invention, both as to its structure and operation, may be gleaned in part by a study of the accompanying exemplary drawings, in which like reference numerals refer to like parts. The drawings are not necessarily to scale, emphasis instead being placed upon illustrating the principles of the invention.

FIG. 7a shows the results of an industry-standard decompression technique and FIG. 7b shows the results of a PIXON® decompression process.

FIG. 8a shows the results of an industry-standard decompression technique and FIG. 8b shows the results of a PIXON® decompression process.

FIG. 9a shows the results of an industry-standard decompression technique and FIG. 9b shows the results of a PIXON® decompression process.

FIGS. 11a-11e illustrate the progressive steps involved in an exemplary interpolation scheme for compression of an input image (FIG. 11a).

DETAILED DESCRIPTION OF THE INVENTION

Figure 1:
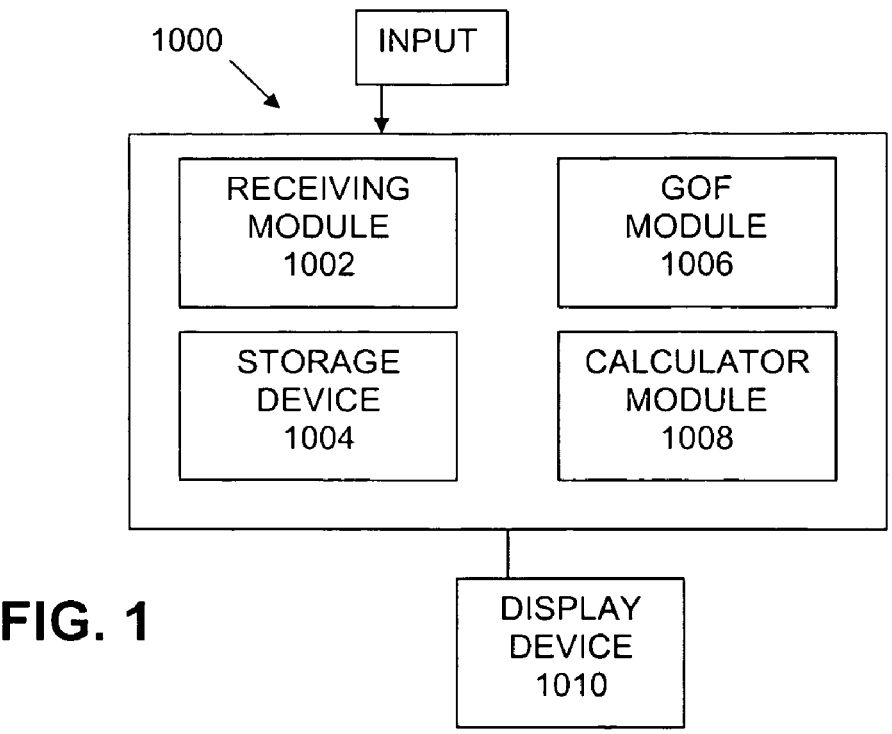
FIG. 1 is a block diagram of a simplified exemplary controller module for decompressing an image using a PIXON® method in accordance with the invention.

Certain embodiments as disclosed herein provide for methods and systems for using the PIXON® method to achieve superior image compression/decompression. Although various embodiments of the present invention will be described herein, it is to be understood that these embodiments are presented by way of example only, and not limitation. As such, this detailed description of various alternative embodiments should not be construed to limit the scope or breadth of the present invention.

To understand the operation of the invention it is useful to briefly review the operation of the PIXON® method. (See "The Pixon Method of Image Reconstruction" by Richard C. Puetter and Amos Yahil, 17 Jan. 1999, which is incorporated herein by reference)

The PIXON® method at once provides a basis for both lossless and lossy compression/decompression as the tolerance is varied from tighter than the least significant bit of the image to progressively looser tolerances that gradually decrease image detail. Further, the tolerance level can be specified in a position dependent way, allowing different levels of compression/decompression in different parts of the image.

The PIXON® method minimizes complexity by smoothing the image model locally as much as the image data will allow, thus reducing the number of independent patches, or PIXON® elements, in the image. In a common implementation of the PIXON® method, the image is written as an integral over a pseudo-image $$I(y) = \int dz\, K(y,z) \phi(z),$$

with a positive kernel function, K, designed to provide the smoothing. The kernel function may also be referred to as the PIXON® kernel that can have a spatially variable size and shape. The technique iteratively calculates a pseudo-image $\phi$ which is defined on an image data pixel grid. This pseudo-image is not the true image, but is used along with the image data pixel grid to perform the numerical calculations required to generate the PIXON® distribution and the resulting image. As in the case of the non-negative least-squares fit, requiring the pseudo-image $\phi$ to be positive eliminates fluctuations in the image I on scales smaller than the width of K. This scale is adapted to the image data. At each location, the scale is allowed to increase in size as much as possible without violating the local goodness-of-fit (GOF). Complexity can be reduced not only by using kernel functions of different sizes to allow for multi-resolution, but also by a judicious choice of their shapes. For example, circularly symmetric kernels, which may be adequate for the reconstruction of most astronomical images, may not be the most efficient smoothing kernels for images with elongated features, e.g., an aerial photograph of a city. The choice of kernels is the "language" by which the image model is specified, which should be rich enough to characterize all the independent elements of the image.

The PIXON® method for decompression of images can include a simultaneous search for the broadest possible (largest area, volume, etc.) kernel functions and their associated pseudo-image values that together provide an adequate fit to the data. In practice, the details of the search may vary depending on the nature of the PIXON® method used. Generally, however, one alternately solves for the pseudo-image given a PIXON® map of kernel functions (selection of kernels at each location) and then attempts to increase the scale sizes of the kernel functions given the current image values. The number of iterations required varies depending on the complexity of the image, but for most problems a couple of iterations may suffice. The criterion for selecting the appropriate kernel is the largest PIXON® kernel whose GOF and signal-to-noise ratio (SNR) within that footprint pass predetermined acceptance conditions set by the user. If no kernel has adequate GOF, a delta-function kernel is assigned, provided that the SNR for its footprint is high enough. If the SNR also fails to meet the specified condition, no kernel is assigned. Note that the SNR required by the PIXON® method may not be per pixel in the image data, but rather the overall SNR in the image data footprint of the PIXON® kernel. The PIXON® method is as effective in detecting large, low-surface-brightness features as small features with higher surface brightness. Acceptance or rejection of the feature is based in both cases on the statistical significance selected by the user.

With this background information in mind, the present invention will now be described with reference to FIG. 1. FIG. 1 is block diagram of an exemplary controller module that may be used to implement the PIXON® decompression method. In one embodiment, the controller module may include a receiving module 1002, a calculator module 1008 and a goodness of fit module 1006. The receiving module 1002 may be coupled to the calculator module 1008 and the goodness of fit (GOF) module 1006 and configured to receive an image file comprising an industry-standard decompressed image where the image comprise a plurality of locations corresponding to the image data. In most situations, the locations will correspond to pixels, or a block of pixels, within an array of pixels, but other indexing techniques may be used to define a location, such as defining a grid comprising an array of segments within the image. The industry-standard decompressed image may originate from a standard still camera, video camera, infrared camera, X-ray imager, radar imager, or a multitude of other imaging devices. Prior to decompression according to the present invention, the images will have been compressed by an industry-standard compression scheme into an industry-standard compressed image (or original compressed data file) to transmit or store the images in a smaller size file, for example. The industry-standard decompressed image received may be stored in a storage device 1004 in communication with the GOF module 1006 and the calculator module 1008. After decompression, the decompressed image file may be saved in the storage device and/or may be output for display by a display device 1010 such as a printer, computer monitor or other visual display device or communicated to an external device for further processing.

Figure 2:
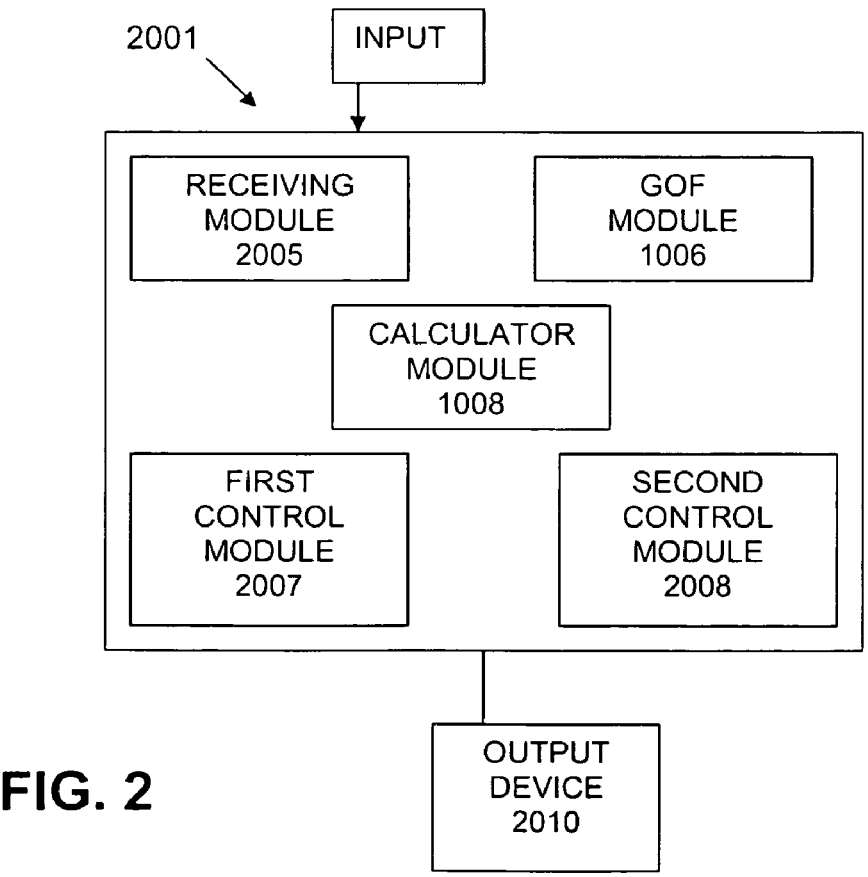
FIG. 2 is a block diagram of an exemplary control module for compressing and decompressing an image using the PIXON® method.

The storage device 1004 may include volatile and/or non-volatile storage, for example read only memory (ROM), non-volatile random access memory (NVRAM), etc. along with one or more volatile storage devices, such as, random access memory (RAM). The calculator module 1008 includes computer code comprising subroutines for executing the PIXON® method for smoothing the decompressed input image as described below FIG. 2 is a block diagram of an exemplary module 2000 for use in a computer-based system for compressing and decompressing an image using a PIXON® method in accordance with the invention. The module 2001 includes a receiving module 2005, a first control module 2007, a second control module 2008, a calculator module 1008 and a goodness-of-fit module 1006. The receiving module 2005 is configured to receive an input image file comprising image data and a plurality of locations corresponding to the image data. The calculator module 1008 and/or its associated memory (not shown) have stored therein computer program code for executing the method to generate a PIXON® map corresponding to the density of information in the input image. The first control module 2007 is configured to execute a first algorithm that utilizes the PIXON® map to calculate one or more image data points to generate an image map that represents a model of the received image data. The second control module 2008 may be configured to execute a second algorithm configured to optimize the one or more image data points, including the positions and intensities of the image data points to reduce the number of image data points. The second control module 2008 may also be configured to re-optimize the reduced number of image data points. An output device 2010 may be a display device if the output is intended for viewing, or may be an interface or network connection for communication of the resulting compressed or decompressed image file to another device.

Figure 3:
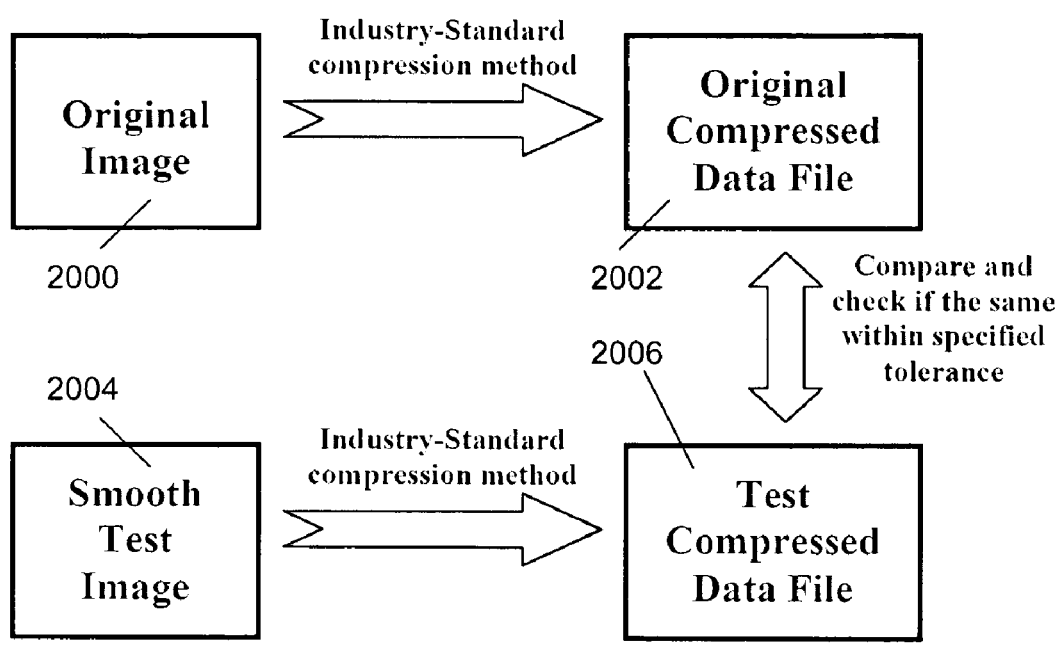
FIG. 3 is a block diagram of the general decompression scheme for images that have been compressed using industry-standard methods.

FIG. 3 illustrates the steps of the general decompression scheme for processing of an image that has been compressed using an industry-standard compression method. The original image 2000 may have been produced by a standard still camera, video camera, infrared camera, X-ray imager, radar imager, or any of a multitude of other imagers. The images can also be stored on a disk or video archive that is to be transmitted by radio, television, Internet, or other transmission means. Generally, because of limited capacity of transmitting large volumes of image data, the images or video are compressed with some industry-standard compression scheme to obtain the compression image data (e.g., Original Compressed Image Data File, or "OCDF") 2002. A Smooth Test Image (STI) 2004 is selected from a solution space comprising a plurality of Smooth Test Images (STIs) generated using the PIXON® method according to the present invention and is compressed using the same industry-standard compression scheme that had been used on the OCDF. The Test Compressed Data File (TCDF) 2006 is compared to the OCDF 2002 to determine the goodness-of fit within a pre-determined tolerance of Original Compressed Data File 2002. If the Test Compressed Data File fits within specified tolerance, it is selected as representative of the original image.

Figure 4:
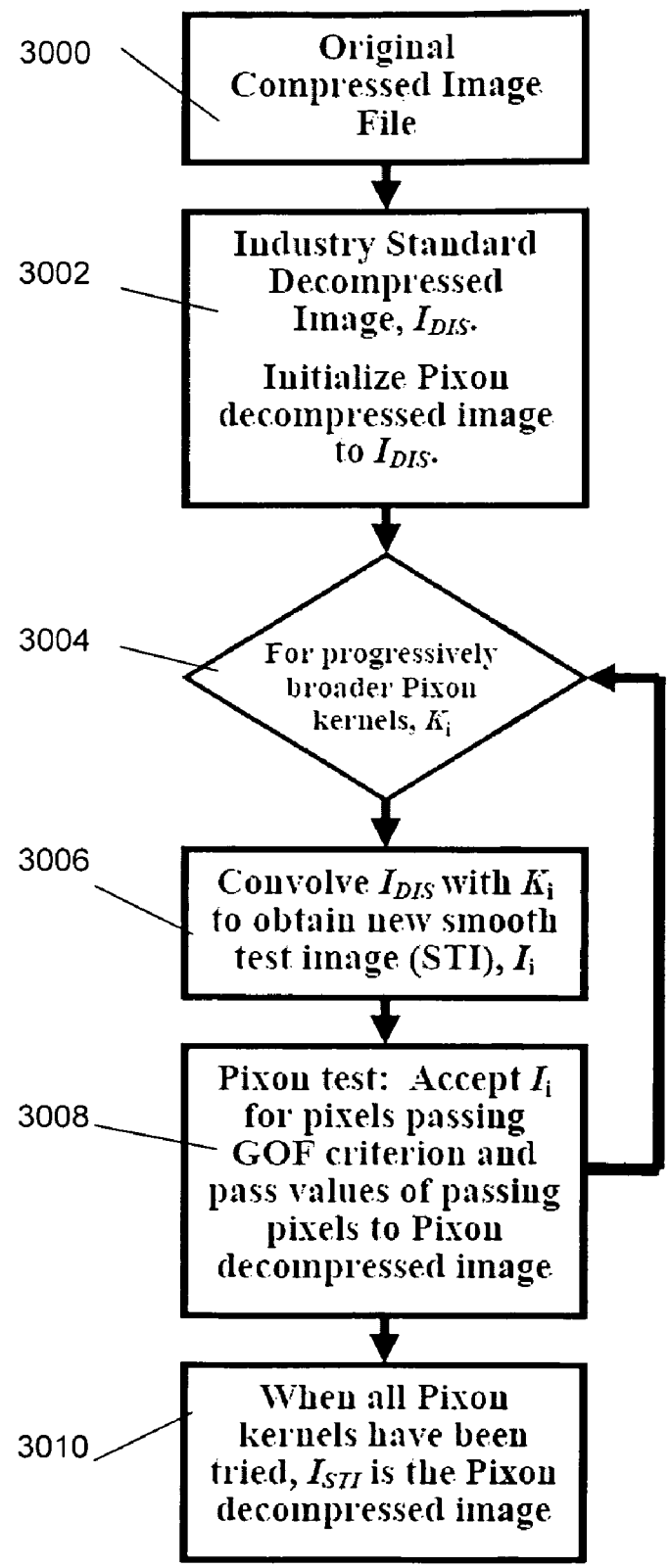
FIG. 4 is a flow chart showing the steps of the inventive decompression method for use on images that have been compressed using industry-standard methods.

FIG. 4 is a flow chart showing the steps of an exemplary method of compression/decompression of an image in accordance with the present invention. The steps of this method may be implemented using a processing module such as the one described with reference to FIG. 1. In this embodiment, the method for generating smooth test images begins with the input of an industry-standard decompressed image into processing module 1000. For high levels of compression, this decompressed image is likely to be full of block and mosquito artifacts. The PIXON® method is used to smooth this starting image to remove artifacts while maintaining the GOF within a specified tolerance to the original compressed image data file. As illustrated in FIG. 4, the process starts at step 3000, in which an original compressed data file (OCDF) is received. In step 3002, the corresponding industry-standard decompression method is used to decompress the OCDF to produce an input industry-standard decompressed image $I_{DIS}$. The PIXON® decompressed image is initialized on the $I_{DIS}$ and will be modified in the steps that follow. In step 3006, the input decompressed image is smoothed using PIXON® kernels selected from a plurality of different PIXON® kernels $K_i$. In the preferred embodiment, the smallest kernels within the plurality of kernels is applied first, however, other criteria may be used for selecting the first kernel to initiate this iterative process. The PIXON® smoothing process involves performing convolutions of the input decompressed image with a plurality of PIXON® kernels to form a plurality of smooth test images (STIs). The next step 3008 is a PIXON® test that compares the goodness-of-fit of each TCDF corresponding to each STI at each location in the image for a plurality of locations and selects as the PIXON® decompressed image for each location the STI that has the broadest PIXON® kernel and has a TCDF that still meets the specified goodness of fit tolerance.

In FIG. 4, the PIXON® test is performed sequentially, one PIXON® kernel at a time, in step 3008. In this step, the candidate decompression image is compressed using the industry standard compression method to produce a test compressed data file (TCDF). A variety of GOF (Goodness-of-Fit) figures of merit may be used to determine if the TCDF is within the given tolerance of the OCDF. For JPEG or MJPEG compressed images, an exemplary procedure would involve comparing on a block-by-block basis and determining if the sum of the squares of the difference between the quantized DCT image data for the OCDF and the quantized DCT of the TCDF is less than a specified tolerance, i.e., determine if $$GOF_{8\times 8\ block} = \sum_{pixels} (OCDF_i - TCDF_i)^2 \leq \text{tolerance.}$$

where the GOF criterion for each 8×8 pixel block is defined as the sum is over all of pixels in the 8×8 pixel block, $OCDF_i$ is the quantized DCT value in pixel i for the Original Compressed Data File, TCDF is the corresponding pixel value for the Test Compressed Data File, and the predetermined tolerance is given by tolerance. The goal is to produce a Smooth Test Image that is as smooth as possible at each location while still meeting the GOF tolerance for each 8×8 pixel block in the image.

For compression schemes that use motion estimation to increase the level of compression, the GOF will not necessarily be based on a single frame, but would probably include how well the moving object fit over multiple frames. The exact details of building an effective GOF criteria will vary from compression scheme to compression scheme, and will also vary according to the level of computational load tolerated by particular implementations. Nonetheless, the goal of any effective GOF is to measure how well a particular Test Compressed Data File matches the Original Compressed Data File.

Returning to step 3008 of FIG. 4, for pixels that pass the GOF criterion, the smooth test image is accepted as the new PIXON® decompressed image at those pixels. For the pixels that do not pass the GOF criterion the PIXON® decompressed image will remain the same as those in the last pass of the loop. The PIXON® decompressed image is then processed again to determine whether they can be smoothed further by returning the smoothed image to step 3004 where the next largest kernel is selected for the smoothing $I_{DIS}$ in step 3006. This smooth test image (STI) is again compressed using the same industry-standard compression method and compared at step 3008 against the OCDF to identify those pixels that pass the GOF criterion, and again passing pixels of the STI are used to update those pixels in the PIXON® decompressed image. Once all of the kernels have been tried, in step 3010, the PIXON® decompressed image is as smooth as possible given the family of PIXON® kernels selected and the processing stops. The resulting PIXON® decompressed image may then be output to a display device, stored in memory, or transmitted to an external device for further processing of the decompressed image. Further processing may involve such activities as performing facial recognition, image analysis, or incorporation of the image into a publication of some type, or any of a virtually endless list of possible uses for decompressed images.

The quality of the decompression achieved by the PIXON® decompression scheme will depend on the size of the solution space from which the smooth test image is selected. The procedure described above has a solution space that contains only those images that can be obtained by smoothing the industry-standard decompressed image by varying degrees in a position dependent manner. If the solution space were to be the space of all possible images, then the resulting decompressed image will be the smoothest possible image that compresses to the original compressed image data file (OCDF) within the specified tolerance. This image will not be the original source material image even if the tolerance is set to zero since information is generally lost in the compression process. While the smooth test image will be smoother than the original image, it will be much closer to the original image than the industry-standard decompressed image since it will be free of artifacts, assuming the original image was artifact-free.

Figure 5:
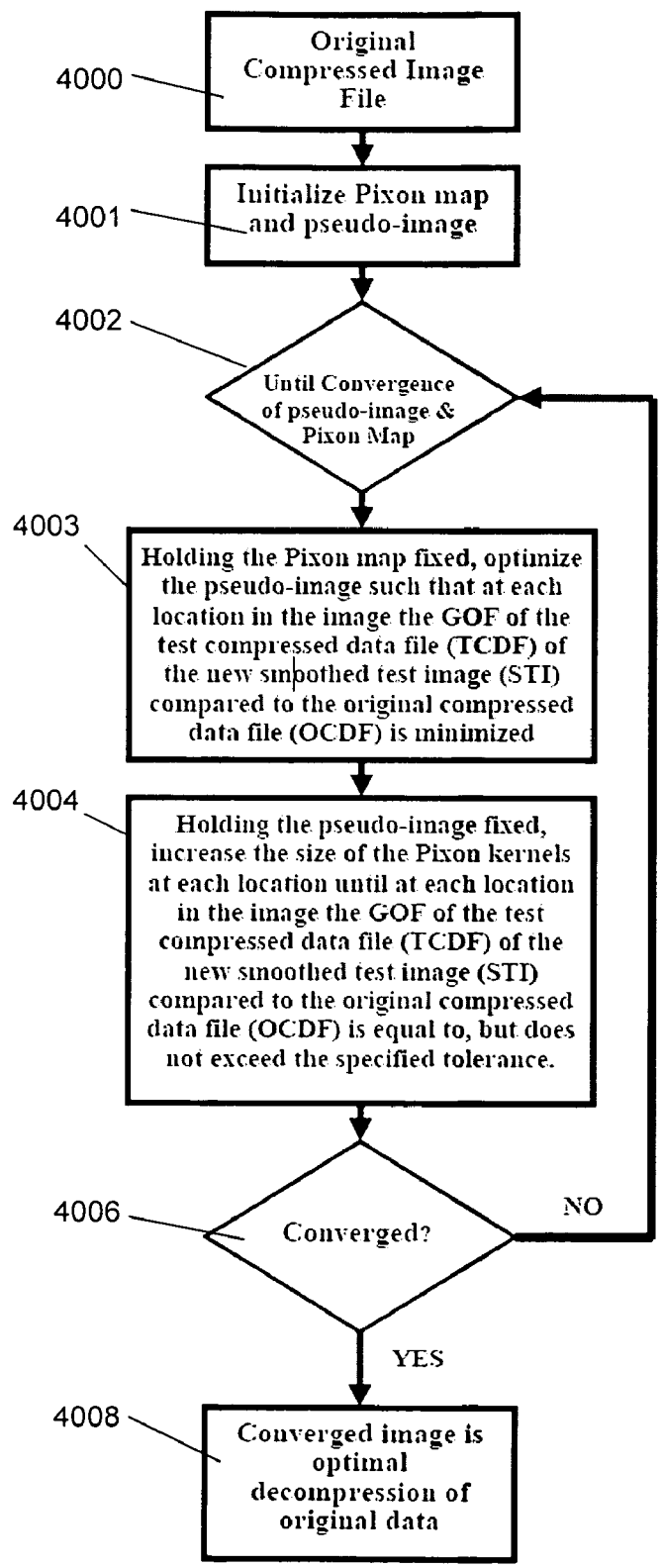
FIG. 5 is a flow chart showing the steps of an alternative inventive decompression method for use on images that have been compressed using industry-standard methods.

In another embodiment of the PIXON® decompression method, a larger solution space can be obtained if a general PIXON® image model consisting of a pseudo-image smoothed by a collection of PIXON® kernels is used. The resulting solution space is a much larger solution space, and does not rise to the level of the "complete" solution space because a finite set of PIXON® kernels is used. A larger solution space can be obtained if one uses a general PIXON® image model comprised of a pseudo-image smoothed by a collection of PIXON® kernels, i.e., writing the Smooth Test Image as $$I_{STI}(\vec{x}_i) = \int_{V_{\vec{y}}} K(\vec{y}, \vec{x}_i)\phi(\vec{y})d\vec{y},$$

where this equation is written using integration over the volume in $\vec{y}$-space, $V_{\vec{y}}$, for a general n-dimensional image (for conventional 2-d images this would be a simple integral over the 2-d image), $\phi(\vec{y})$ is the pseudo-image at position $\gamma$, and $K(\vec{y},\vec{x}_i)$ is the PIXON® kernel at pixel $\vec{x}_i$ (for radially symmetric kernels, which is a common assumption, $K(\vec{y},\vec{x}_i)=K(\|\vec{y}-\vec{x}_i\|,\vec{x}_i)$). The pseudo-image and PIXON® map are then obtained by finding the combination of broadest PIXON® kernels at each pixel along with the pseudo-image that minimizes the GOF. This can be achieved by a number of multi-dimensional optimization techniques that follow the general steps shown in FIG. 5.

In the illustrated steps, the original compressed image file (OCDF) 4000 is input into a processor programmed for executing the PIXON® method and used to initialize a PIXON® map and a pseudo-image (step 4001) which are then optimized by a number of steps that involve iteratively generating and testing a compressed Smooth Test Image (STI) against the OCDF. One of the many possible ways by which optimization of the pseudo-image and PIXON® kernels selected at each position can be achieved is by alternative optimization of the pseudo-image by minimizing the GOF of the test compressed data filed (TCDF) to the OCDF while holding the PIXON® kernels fixed (step 4003), followed by maximizing the width of the PIXON® kernels by smoothing each image location with progressively broader kernels until a predetermined GOF tolerance between the TCDF and the OCDF cannot be met (PIXON® map calculation) (step 4004). This two-step procedure can then be iterated (step 4002) until convergence is obtained (step 4006). The image corresponding to the convergence of the PIXON® map and the pseudo-image will be the optimal decompression of the original compressed image file (step 4008). The optimal decompressed image may then be output as described with reference to the previous embodiment.

Unlike the first method for identifying best fitting smooth test image, the above-described method of identifying the optimal decompressed image need not be initiated using the original decompressed data file. As an alternative, the PIXON® method can be initiated on a zero image, or at any other image, and the iterative process started using the smallest possible PIXON® kernel, which is the delta function. While it may require a larger number of iterations to arrive at convergence, the result will still be an optimally decompressed image.

A benefit of this iterative procedure relative to smoothing the industry-standard decompressed image of the first embodiment is that smoothing in the former method cannot introduce image content that is not contained in the compression data since smoothing can only take away, and does not introduce, structure. Iterative, simultaneous optimization of a pseudo-image and the PIXON® map (the collection of appropriate PIXON® kernels to use at each pixel) can introduce spatial structure that was lost in the compression step.

Through the PIXON® method's powerful minimum complexity constraint, optimally fitting the information content present in the compressed image automatically results in the image model containing information which may have been lost by compression.

The PIXON® decompression schemes described above can be extended to a wide range of industry-standard compression methods. In some embodiments, the approach is based on the fact that the industry-standard compression method for compressing the original image or the smooth test image to their respective compressed image data files is arbitrary. Thus the industry-standard compression method may be any compression approach, e.g., MPEG-2, MPEG-4, MOV, AVI, or H.264. Further the PIXON® test, i.e., evaluation of the GOF of the test compressed image data file 2006 to the original compressed image data file is independent of the compression method. Indeed, all the steps of the above-described decompression methods are independent of the compression method. While changing the compression method changes how one calculates the compressed image data files and may change the details of how the GOF is used and optimized, it does not change the overall approach of PIXON® modeling of the image and simultaneous optimization of the PIXON® decompressed image.

FIGS. 6-9 provide examples of application of the inventive PIXON® decompression method to different types of images.

Figure 6A:
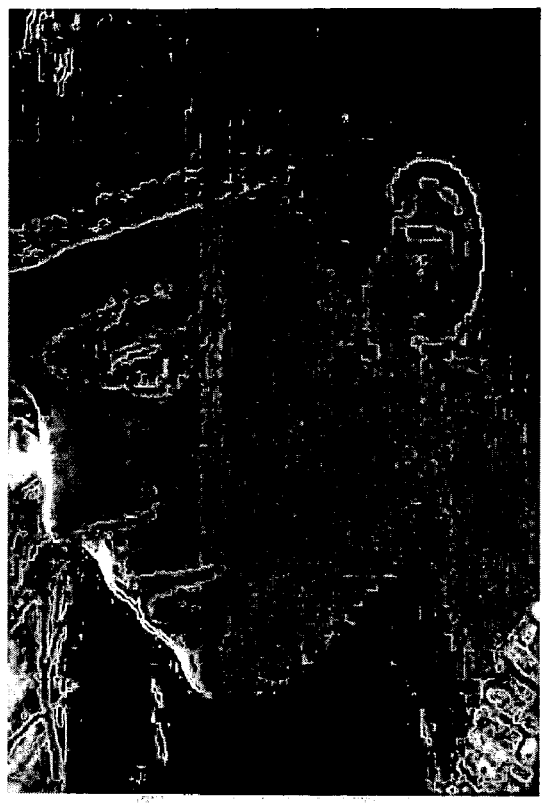
FIGS. 6a and 6b are photographic images showing the exemplary results of decompression of a first sample image file using an industry-standard decompression method and the inventive PIXON® decompression method, respectively.
Figure 6B:
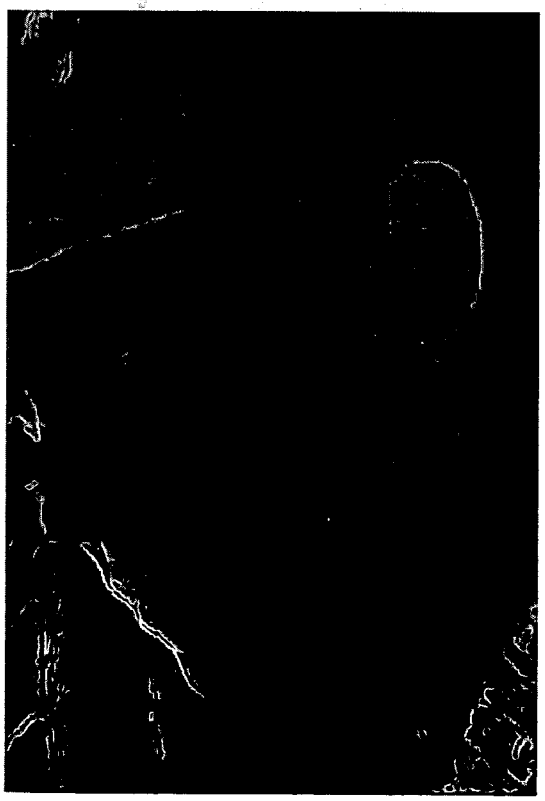

FIGS. 6a and 6b provide a comparison of the results of an industry-standard decompression method and the PIXON® decompression method, respectively, of an MJPEG frame from a television broadcast.

Figure 7A:
FIGS. 7a and 7b are photographic images showing the exemplary results of decompression of a second sample image file, where
Figure 7B:

FIGS. 7a and 7b provide an example of PIXON® decompression (FIG. 7b) of an image produced by a still image camera compared to industry-standard JPEG decompression (FIG. 7a).

Figure 8A:
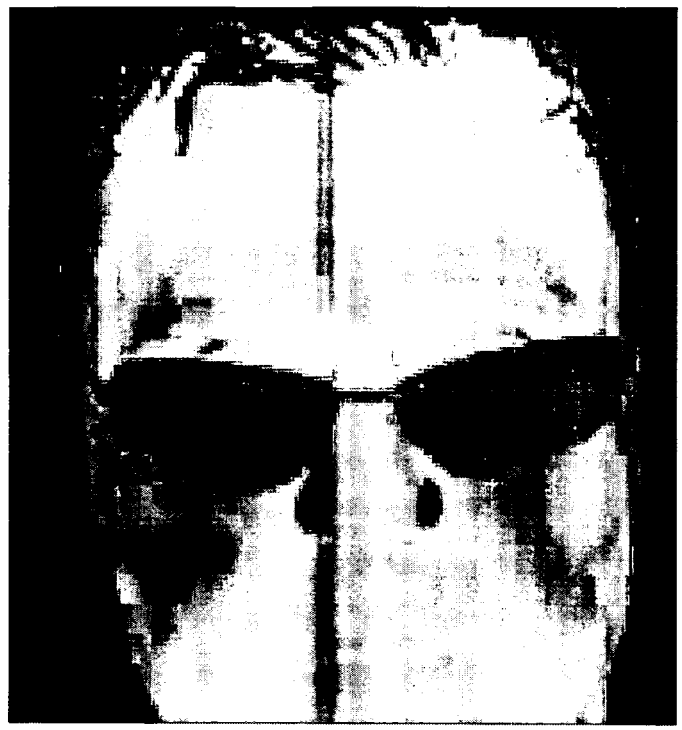
FIGS. 8a and 8b are photographic images showing the exemplary results of decompression of a third sample image, a thermal infrared image file, where
Figure 8B:
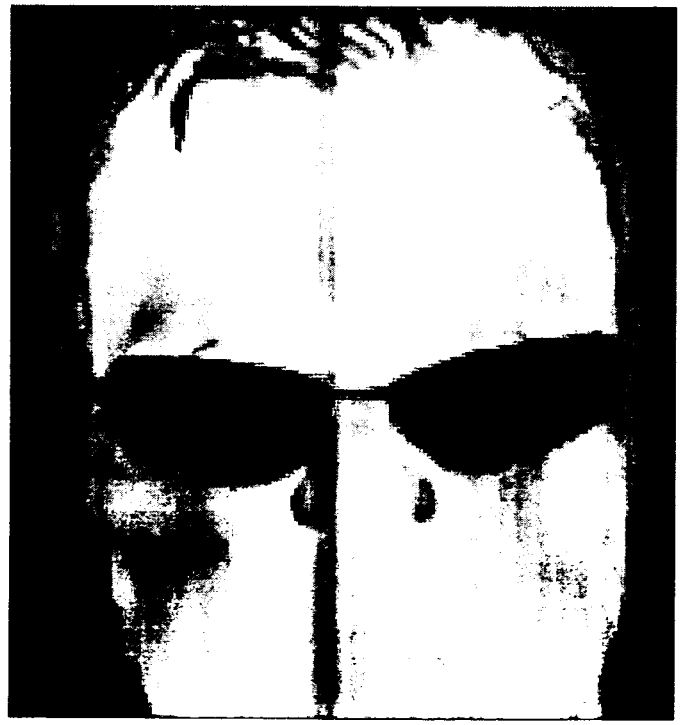

FIGS. 8a and 8b are examples of the results of JPEG and PIXON® decompression, respectively, of a thermal infrared image that was originally compressed using the industry-standard JPEG compression. Infrared imaging is often used for the inspection of thermal leaks, and artifacts and noise can interfere with accurate interpretation of the image.

Figure 9A:
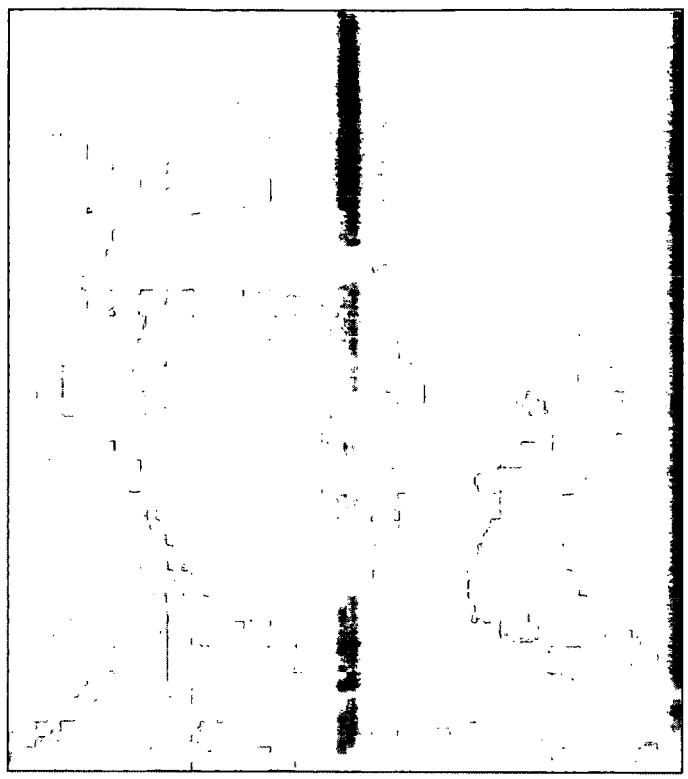
FIGS. 9a and 9b are photographic images showing the exemplary results of decompression of a fourth sample image, from night vision goggles, where
Figure 9B:
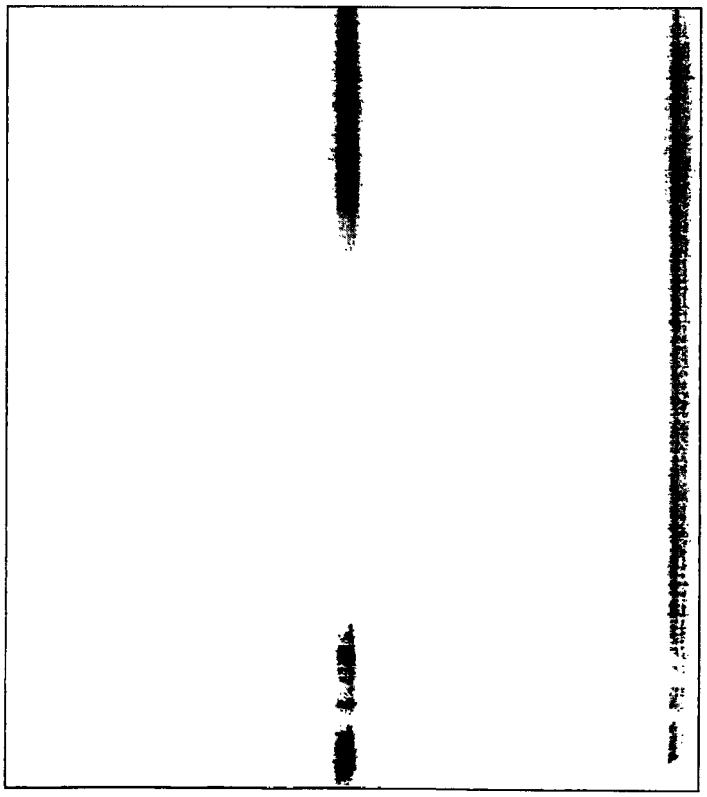

FIGS. 9a and 9b are examples of the results of industry-standard decompression and PIXON® decompression, respectively, of imagery produced by night-vision equipment as might be used in a military or law enforcement application.

Figure 10:
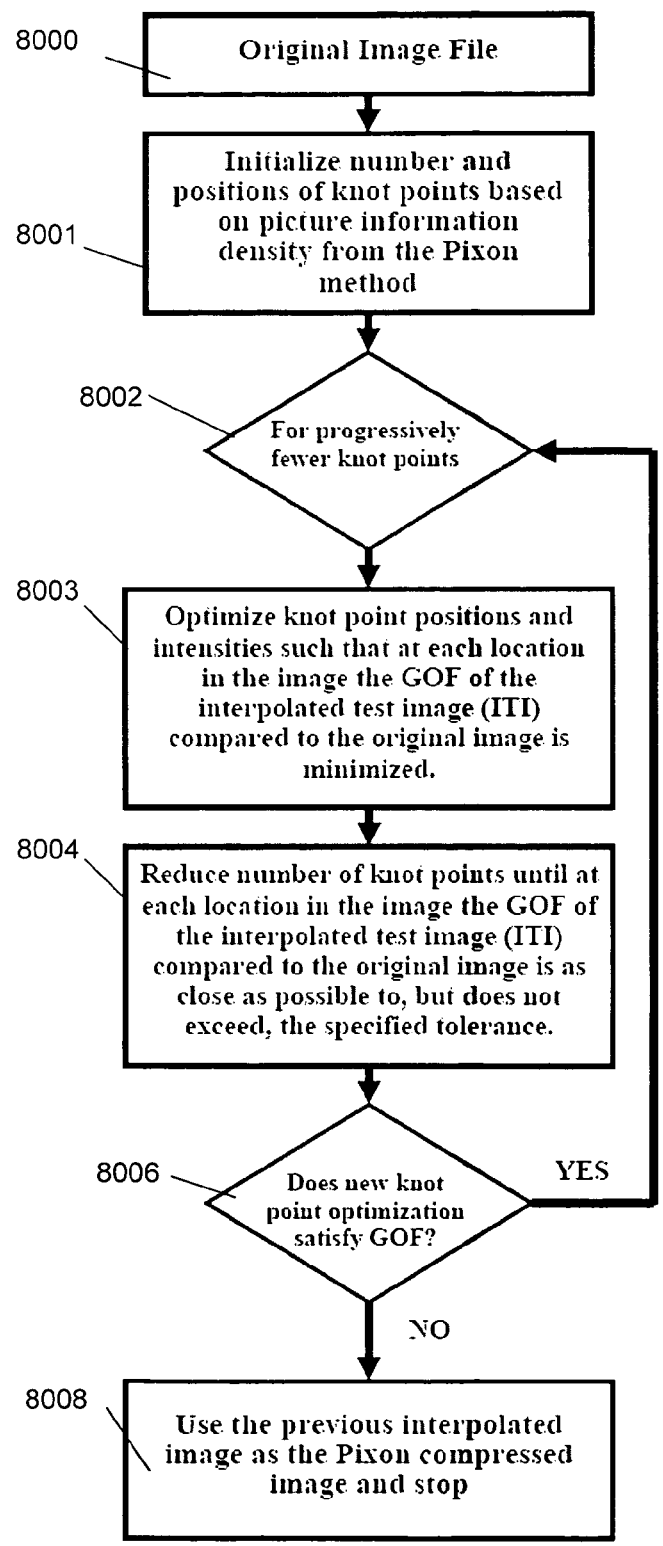
FIG. 10 is a flow chart showing steps of an exemplary PIXON® image compression procedure.

FIG. 10 illustrates the steps of a PIXON® image compression procedure based on image interpolation. The PIXON® method identifies the information density within images and thereby offers a general framework for image compression, i.e., it offers the potential of finding a terse and natural language for image expression. In order to use PIXON® methods to compress images, a terse language in which to express images may be required which is separate from the language that expresses a pseudo-image smoothed by the PIXON® kernels indicated in a PIXON® map. One possible language that may be useful and carries greater degree of information implicitly in its structure is image interpolation. While various types of interpolation may be used, consider as an example a simple interpolation method which constructs a model of the image through linear interpolation between knot points. The knot points may be selected based on picture information density as provided by a PIXON® map. Any suitable method of polynomial fitting may be used for interpolating between the knot points, for example, cubic splines (such as B-splines). As is known in the art, two dimensional (2-D) image processing frequently uses spline functions for interpolation. Alternatively, any curve fit may be used (for example linear or quadratic fit).

Once the initial approximations to the knot points have been found, the knot points may be optimized by an algorithm, for example simplex minimization algorithm. A simplex minimization algorithm may derive the simplest geometrical figure in a given number of dimensions that spans all of those dimensions, e.g., a triangle in two dimensions. The simplex minimization algorithm constructs a simplex figure and applies a basic set of translations and scalings to individual vertices to move them around through a given n-dimensional space. These operations continue until the simplex figure brackets a local minimum of some cost function (goodness of fit or merit function) defined in the space. After each translation or scaling, the cost function is calculated at the new vertex position in order to decide which translation/scaling operation to apply at the next step, and which vertex to apply it to. The technique is applied to each knot point in turn to produce a new set of optimized knot points.

A flowchart for the steps of this procedure is provided in FIG. 10. According to the present invention, the interpolation approach to compression starts with the input of an original image file that is to be compressed (step 8000). The PIXON® method is used to identify the information density within the original image (step 8001) and specify an initial condition consisting of numbers and positions of knot points. Step 8002 is the starting point for the iterative process for progressively reducing the number of knot points. In step 8003, the knot point positions and intensities are optimized so that, at each location of the image, the GOF of the interpolated test image (ITI) to the original image is minimized. Then, in step 8004, the number of knot points is reduced until, at each location within the image, the GOF of the ITI compared to the original image is a close as possible to, but does not exceed a predetermined tolerance. In step 8006, the new knot points (or neighborhood of a knot point) are tested. If the new knot point optimization satisfies the GOF criterion, steps 8000, 8002 and 8004 are repeated. If not, the last prior interpolated image is selected for use as the PIXON® compressed image and the process is terminated. The compressed image may then be stored in memory or communicated to an external device for transmission, storage or other operation.

Figure 11D:
Figure 11E:

FIGS. 11a-11e illustrate an example of application of the inventive interpolation scheme to the widely-used test image of "Lena". FIG. 11a shows the original image, FIG. 11b shows the knot point positions, and FIG. 11c shows the interpolation grid for linear triangulation and interpolation. FIGS. 11d and 11e show a standard JPEG- and PIXON®-generated images, respectively, at roughly the same compression rate. In some embodiments, standard compression methods can be used to encode the knot point data that allows the use of an interpolation scheme and its optimization in terms of its complexity based on PIXON® method concepts. The density of knot points controls the density of image information and represents a PIXON® map.

The image interpolation compression scheme described above is only one possible method for taking advantage of the knowledge of the image information density provided by the PIXON® method. Another example of a possible compression scheme would involve basing the compression on quantized DCTs (or other transforms) as many schemes are today, modifying such methods by using knowledge of the information density to change the level of quantization on a location by location basis. To illustrate, if one used 8×8 pixel DCT boxes and selected 16 different quantization matrices, a PIXON® analysis may be used to determine which quantization matrix may be appropriate in each of the 8×8 pixel boxes. This additional information may be relatively small, being the 16 8×8 Q matrices (or one Q matrix and 15 scale factors) and a 4-bit image with 64 times fewer pixels than the original image. Other DCT box sizes (or combination of box sizes) may be used as well as different numbers of Q matrices (or scale factors). The PIXON® map may also be used to select the appropriate sizes of DCT boxes at each location.

Decompression of a compressed data file generated using the above-described procedure is straightforward. First, the knot position and intensity data must be decompressed. As previously mentioned, this data would normally be compressed with any of a number of standard compression schemes for a string of intensity values (the knot intensity values) and a set of spatial coordinates (the knot point positions). Once this data is in hand, one simply constructs the interpolated image according to the specified interpolation scheme, then stops. Unlike the previously described decompression-only PIXON® schemes, there is no optimization to be performed. Consequently the decompression step is very fast.

The knowledge of the density of picture information provided by the PIXON® method can be used in many ways to modify current methods and devise entirely new methods of image compression and decompression. It may be used to find densities of knot points for image interpolation schemes. It may also be used to determine quantization levels and box sizes for DCT-based compression schemes. Knowledge of the information density within is the key enabling factor in making the scheme efficient and reaching higher rates of compression than possible without PIXON® analysis.

The PIXON® method's ability to measure and control picture information density gives it the ability to make substantial advances in image decompression and compression. The simplest schemes involve image decompression only. In such schemes, images compressed with existing compression methods (e.g., JPEG, MPEG, H.264) can be decompressed by the PIXON® approach to provide greater resistance to artifact (block and mosquito) generation. This will allow the same images or videos to be compressed to a much greater degree while still achieving the same image quality. PIXON® decompression also offers the ability to recover image information that was lost in the compression process. The recovery of this information requires additional computation over the simplest schemes, and is akin to the PIXON® method's ability to recover information on spatial frequencies not contained in the data during image reconstruction of diffraction limited imagery. Finally, the principles of the PIXON® method can be used to develop entirely new and highly efficient methods of image compression based on minimum complexity image interpolation or other applications of knowledge of picture information density.

Various implementations of the invention are realized in electronic hardware, computer software, or combinations of these technologies. Some implementations include one or more computer programs executed by one or more computing devices. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., user interfaces, mice or trackballs, and keyboards), and one or more output devices (e.g., display consoles and printers).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention.

Accordingly, the present invention is not limited to only those implementations described above. Those of skill in the art will appreciate that the various illustrative modules and method steps described in connection with the above described figures and the implementations disclosed herein may often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions may be moved from one module or step to another without departing from the invention.

Moreover, the various illustrative modules and method steps described in connection with the implementations disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium including a network storage medium. An exemplary storage medium may be coupled to the processor such that the processor may read information from, and write information to, the storage medium. In the alternative, the storage medium may be integral to the processor. The processor and the storage medium may also reside in an ASIC.

The above description of the disclosed implementations is provided to enable any person skilled in the art to make or use the invention. Various modifications to these implementations will be readily apparent to those skilled in the art, and the generic principles described herein may be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations and that the scope of the present invention is accordingly limited by nothing other than the appended claims.

The invention claimed is:

1. A method for decompressing an image originally compressed using an industry-standard compression method, the method comprising:

inputting an original compressed image file having a plurality of locations corresponding to image data into a processor having a memory and software stored therein for decompressing an image and executing a PIXON® method;

decompressing the original compressed image using a corresponding industry-standard decompression method to produce an original decompressed image data file;

initializing the PIXON® decompressed image with the industry standard decompressed file;

smoothing the original decompressed image using the smallest kernel selected from a plurality of different kernels to produce a first smooth test image;

compressing the first smooth test image using the industry-standard compression method;

comparing the first compressed candidate image to the original compressed image file to determine a goodness-of-fit within a predetermined tolerance at each of the plurality of locations within the original compressed image file;

accepting the first smooth test image as the PIXON® decompressed image for each location at which the goodness-of-fit is within the predetermined tolerance and leaving the PIXON® decompressed image unchanged at all other locations;

performing the steps of smoothing and comparing for each remaining kernel of the plurality of different kernels to produce a plurality of different candidate images, wherein, following each iteration, the corresponding smooth test image is accepted as the PIXON® decompressed image at each location at which the goodness-of-fit is within the predetermined tolerance and all other locations are left with the previous PIXON® decompressed image, and wherein the resulting PIXON® decompressed image remains after the final iteration;

storing the resulting PIXON® decompressed image in the memory; and outputting the resulting PIXON® decompressed image to display device.

2. The method of claim 1, wherein the plurality of locations comprises pixels.

3. The method of claim 1, wherein the plurality of locations comprises a block of pixels.

4. The method of claim 1, wherein the steps of smoothing and comparing are performed in parallel for all kernels of the plurality of kernels.

5. A method for generating a decompressed image from a compressed image file that was compressed using a known compression method, the method comprising:

inputting into a processor an original compressed image file having a plurality of image locations, each image location corresponding to image data within the image file, wherein the processor is in communication with a memory having software stored therein for decompressing an image and executing a PIXON® method using a plurality of different kernels;

decompressing the original compressed image using a decompression method corresponding to the known compression method to produce an original decompressed image data file;

initializing the PIXON® decompressed image with the industry standard decompressed file;

smoothing the original decompressed image file using the smallest kernel selected from the plurality of different kernels to produce a first smooth test image;

compressing the first smooth test image using the industry-standard compression method;

comparing the first compressed smooth test image to the original compressed image file to determine a goodness-of-fit within a predetermined tolerance at each of the plurality of locations within the original compressed image file;

accepting the first smooth test image as the PIXON® decompressed image for each location at which the goodness-of-fit is within the predetermined tolerance and leaving the PIXON® decompressed image unchanged at all other locations;

before or after the step of accepting, performing the steps of smoothing, compressing and comparing for each remaining kernel of the plurality of different kernels to produce a plurality of different smooth test images, wherein, following each iteration, the corresponding smooth image is accepted as the PIXON® decompressed image at each location at which the goodness-of-fit is within the predetermined tolerance and all other locations are left with the previous candidate image, and wherein the resulting PIXON® decompressed image remains after the final iteration;

storing the resulting PIXON® decompressed image in the memory; and outputting the resulting PIXON® decompressed image to display device.

6. The method of claim 5, wherein the plurality of locations comprises pixels.

7. The method of claim 5, wherein the plurality of locations comprises a block of pixels.

8. A method for compressing images, comprising:

inputting an image file comprising image data into a processor and memory having software stored therein for executing a PIXON® method, wherein the image file comprises a plurality of locations corresponding to the image data;

executing a first algorithm that utilizes information density within the data images identified by the PIXON® method to calculate one or more image data points to generate an image map that represents a model of the received image data;

executing a second algorithm to optimize the one or more image data points, including the positions and intensities of the image data points to reduce the number of image data points;

re-optimizing the reduced number of image data points;

determining if a goodness-of-fit between the locations corresponding to the input image data and the one or more image data points remains within a predetermined tolerance at each location within the image data;

accepting the one or more image data points as the candidates for image compression at the locations that are within the predetermined tolerance and use corresponding portions of the received image data elsewhere; and generating a compressed image file by combining the accepted image data point for all locations within the input image.

9. The method of claim 8, wherein the one or more image data points comprise knot points.

10. The method of claim 8, wherein the first algorithm comprises an image interpolation algorithm.

11. The method of claim 8, wherein the second algorithm comprises a simplex (or other) minimization algorithm.

12. The method of claim 8, wherein a model of the received image data is constructed through linear interpolation of image intensity between the knot points.

* * * * *